June 5, 1934.  D. J. UHLE ET AL  1,961,311
METHOD OF HEATING CEMENT RAW MATERIAL
Filed March 21, 1931   2 Sheets-Sheet 1
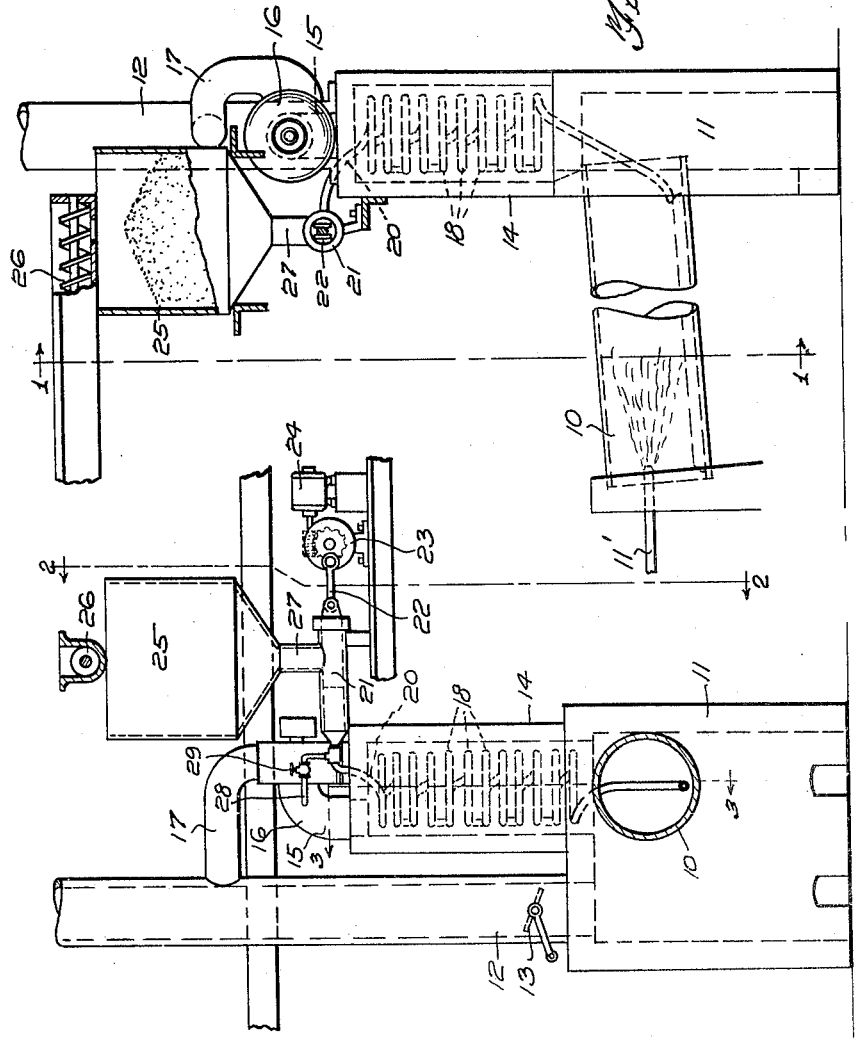
INVENTORS
David J. Uhle,
Max E. Grunewald,
BY
ATTORNEY.

June 5, 1934. D. J. UHLE ET AL 1,961,311
METHOD OF HEATING CEMENT RAW MATERIAL
Filed March 21, 1931  2 Sheets-Sheet 2
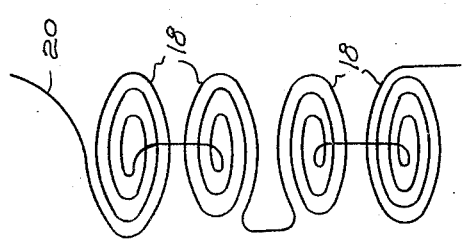
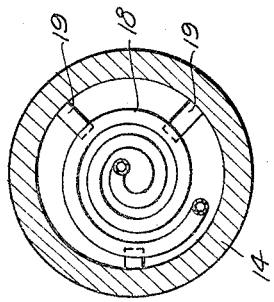
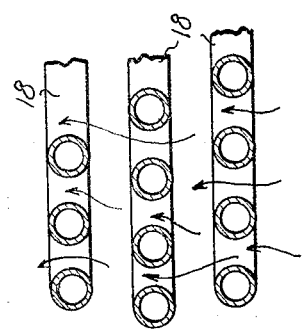
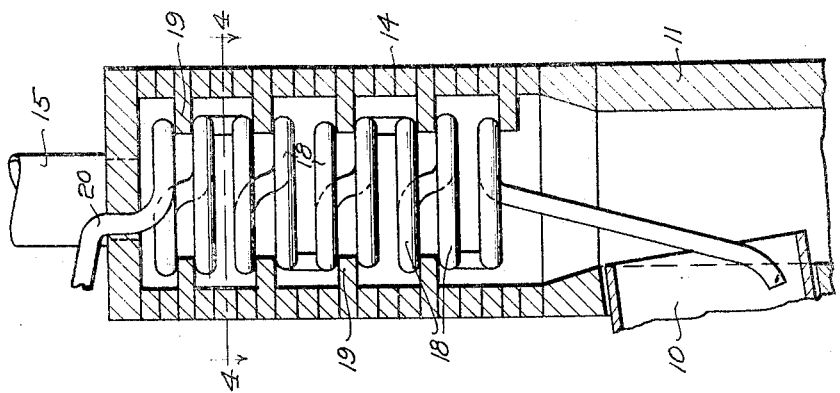
INVENTORS
David J. Uhle,
Max E. Grunewald,
BY
ATTORNEY.

Patented June 5, 1934

1,961,311

UNITED STATES PATENT OFFICE 1,961,311

METHOD OF HEATING CEMENT RAW MATERIAL

David J. Uhle and Max E. Grunewald, Coplay, Pa.

Application March 21, 1931, Serial No. 524,378

11 Claims. (Cl. 222—7)

Our invention relates to a method of preheating finely divided or powered solid material, and feeding the same to a rotary kiln.

The present application is a continuation in part, of our co-pending application for Apparatus for heating cement raw material, filed February 8th, 1929, Serial Number 337,153 which has matured into Letters Patent No. 1,801,467, under date of April 21st, 1931.

By the practice of our method, economy is effected in the use of the fuel, since the heat contained in the waste gases from the rotary kiln is utilized to preheat the powdered solid material. Further, the step of preheating the powdered solid material in the rotary kiln is dispensed with, whereby the entire length of the rotary kiln may be utilized for completing the process.

In accordance with our invention, the heated waste gases from the outlet end of a rotary kiln are passed in proximity to and exteriorly of a preheating tube, which is preferably formed in spiral units. This preheating tube is formed of a suitable heat resisting metal or metals. The dry powdered solid material, such as dry powdered cement raw material, when Portland cement is being produced, is fed into the intake end of the preheating tube, in such a manner that the intake end of the tube is closed or sealed against back pressure. The outlet end of the preheating tube is open and discharges into the rear end of the rotary kiln.

The powdered solid material, such as powdered or finely divided cement raw material has voids between its minute particles, which voids are filled with air. At atmospheric temperature, the powdered cement raw material will not readily flow without the proper addition of air thereto.

At atmospheric temperature, it would be impossible to properly force the powdered cement raw material through the preheating tube, without injecting air into the same, as it would pack within the tube. When this dry powdered cement raw material is heated to a sufficiently high temperature, it flows freely and is converted into a form having the characteristics of a liquid. When the powdered cement raw material is thus preheated, we have found that the same will readily pass through the preheating tube without injecting air into the same. However, where the intake end portion of the preheating tube is not subjected to the action of the heated gases from the rotary kiln, this end portion being relatively cool, we have found it desirable to introduce a small amount of air into such end portion to aid the flowing properties of the material before it passes to the point of heat treatment and before it is heated sufficiently to cause the same to be converted into a form having the characteristics of a liquid. The amount of air to be introduced into this intake end portion naturally varies with the length of such end portion. The temperature to which the material is to be preheated, varies widely, depending upon the chemical and physical characteristics of the material. Satisfactory results can be obtained by heating some cement raw material to a temperature of from 500° F. to 2500° F.

The powdered cement raw material is preheated within the preheating tube, while the intake end of the tube is sealed or closed and its outlet end is open, as explained. The expansion of the heated air within the material, while thus confined within the preheating tube, propels, or aids in propelling the material through the tube.

The powdered cement raw material is, therefore, preheated and converted into a form having the characteristics of a liquid, by the heat contained within the waste gases from the rotary kiln, and the travel of the flowing material is effected in part or whole by the expanding heated air contained within the voids of the material.

While the temperature at which the material is preheated may be widely varied, it is desired to preheat the same to as high a temperature as convenient, without impairing its flowing properties, thereby utilizing as much as possible, of the heat contained in the waste gases, for preheating the material, prior to its entrance into the kiln.

In the accompanying drawings, forming a part of this specification, and in which like numerals are employed to designate like parts throughout the same, Figure 1 is a vertical section taken on line 1—1 of Figure 2, parts being broken away, Figure 2 is a vertical section taken on line 2—2 of Figure 1, Figure 3 is a vertical section taken on line 3—3 of Figure 1, Figure 4 is a horizontal section taken on line 4—4 of Figure 3, Figure 5 is a fragmentary vertical section taken through a plurality of the coiled units, and Figure 6 is a perspective view of the preheating coil element.

In the drawings, wherein for the purpose of illustration, is shown a preferred embodiment of our invention, the numeral 10 designates a rotary kiln, the upper end of which leads into a hollow stack base or flue chamber 11. A powdered coal burner 11' is arranged at the front end of the rotary kiln, as is customary. The numeral 12 designates the stack, supported by the stack base 11. This stack is preferably provided near its lower end with an adjustable damper 13, as shown.

Means are provided for preheating the powdered cement raw material, by the heat contained within the waste gases discharging from the rotary kiln. This means comprises a hood or jacket 14, preferably formed of fire brick, or the like, and preferably arranged upon the stack base 11. The lower end of this hood or jacket is open and is in free communication with the interior of the stack base 11. The top of the hood is closed and is provided with an outlet pipe 15, discharging into the intake end of a rotary blower 16, the outlet end of which discharges into a pipe 17, discharging into the stack 12. The rotary blower 16 may be dispensed with, and when this is done, the bottom of the hood 14 will be provided with a damper, to partly or completely close the same, when it is desired to cause the heated gases from the rotary kiln to pass directly into the stack 12. When the rotary blower is employed, it is not necessary to equip the hood 14 with a damper, as the rotary blower will serve as such.

Mounted within the hood or jacket 14, is an elongated preheating tube, preferably embodying a plurality of flat coils 18, which are arranged in spaced superposed relation, and supported by bricks 19, projecting between certain of the flat coils. The tube is continuous and the flat coils 18 are preferably formed or bent, so that pairs of the coils are connected at their inner ends and pairs of the same are connected at their outer ends. This is the preferred construction, while the invention is in no sense restricted to this precise arrangement. Further, the turns in the several flat coils are staggered or out of alignment, providing tortuous passages for the ascending heated gases. This enables the heated gases to have the maximum contact with the coils of the preheating tube.

By the use of the term "elongated tube", we do not wish to limit ourselves to a tube of any specific length, but contemplate such a length as will be necessary to properly preheat the material and to convert the same into a form having the characteristics of a liquid.

The upper end 20 of the preheating tube is connected with a pump 21, which may be of the reciprocatory type. This pump is driven by a link 22, driven by a disc 23, in turn driven by a variable speed motor 24. The invention is in no sense restricted to the use of a reciprocatory pump, as satisfactory results are obtainable by using a rotary pump of any type, such as a rotary pump embodying a spiral feeding element or a centrifugal rotary pump, may be used.

The numeral 25 designates a hopper for receiving the powdered cement raw material from a screw conveyor 26. This hopper discharges into a pipe 27, which leads to the pump 21. The pump 21 serves to positively force or feed the powdered material into the upper end portion 20 of the preheating tube, and also forms a seal for closing the intake end of the upper end portion 20 of the preheating tube, against back pressure.

Connected with the upper end portion 20 of the preheating tube is a compressed air supply pipe 28, equipped with a cut-off valve 29. By opening valve 29, a suitable amount of compressed air can be supplied into the upper end portion 20 of the preheating coil. This air mixes with the powdered material fed into the end portion 20 by the pump 21, and aids in the flowing of the powdered material so that the pump properly propels the same to the point of heat treatment in the tube. When reaching this point of heat treatment the material will flow readily, as it is converted into a form having the characteristics of a liquid.

We also contemplate constructing the apparatus with two or more preheating coils or units, depending upon the desired capacity of the apparatus.

In the use of the apparatus, for the practice of the method, the heated waste gases from the rotary kiln 10 discharge upwardly through the hood 14, and may be aided in their travel through the hood by the rotary blower 16. The damper 13 in the stack 12 is now partly or wholly closed. The powdered cement raw material contained within the hopper 25 is fed into the pump 21, and is forced by this pump into the upper end portion 20 of the preheating tube. This upper end portion 20 of the preheating tube extends exteriorly of the hood 14, and is relatively cool. The powdered solid material must be positively forced by the pump into the upper end portion 20 of the tube for a sufficient distance, until the same is acted upon by the heat and converted into a form having the characteristics of a liquid, at which time it flows freely. This powdered raw material, upon passing sufficiently into the preheating tube is heated therein so that it is converted into a form having the characteristics of a liquid and will readily flow, as above stated. The air contained within the voids of the heated powdered material expands, producing pressure, which propels or feeds, or aids in propelling or feeding the flowing material through the preheating tube, such flowing material finally discharging into the rear end of the rotary kiln.

The pump 21 may be driven at a selected speed, by the variable speed motor, and the pump will feed a regulated amount of the powdered raw cement material to the preheatng tube, whereby a regulated amount of the preheated flowing material will be supplied to the rear end of the rotary kiln. This is important as it is necessary to properly regulate the amount of cement material supplied to the rotary kiln.

The dry preheated flowing cement raw material discharges into the rotary kiln 10, where the calcination and clinkering are completed in the usual manner, by the heat developed through combustion at the burner. The preheating tube performs the work of preheating the powdered cement raw material, which is ordinarily performed in the rotary kiln, and the preheating is effected by the heat in the waste gases discharging from the rotary kiln. It is believed that little, if any, calcination or other chemical reactions ordinarily occurs in the preheating tube. However, the method may be so practiced that the major portion, or all of the calcination or other chemical reactions, may occur in the preheating tube. The partial or complete calcination in the preheating tube will not impair the fluid properties of the heated materials, and the gases liberated will produce increased pressure, to further aid in the propelling or travel of the heated flowing material.

Should there be any tendency for the powdered solid raw material to pack or clog within the intake end portion 20 of the elongated tube, exteriorly of the hood 14, such tendency may be overcome by opening the valve 29 and supplying a proper amount of air under suitable pressure, into such intake end. The powdered material, at atmospheric temperature, will flow freely when air is supplied thereto, and will flow freely when heated, with or without the added air, as explained.

Should the pump 21 become inoperative or stop, it would be necessary to cool the preheating tube, and this is accomplished by opening the valve 29, whereby compressed air from the pipe 28, at atmospheric temperature, is forced through the preheating tube, thus cooling the same, and preventing the same from being damaged, due to the action of the heat.

While the method has been described, for the sake of illustration, in the treatment of cement raw material, to produce Portland cement, it is not restricted to this purpose. It may be practiced in the treatment of any raw material, which is fed to a rotary kiln in a dry powdered form, for heat treatment in the rotary kiln.

Having thus described our invention, we claim:—

1. The method of preheating powdered solid cement raw material or the like and feeding the same to a rotary kiln, comprising feeding such material at a relatively low temperature into one end of an elongated tube and providing a seal at such end, and passing the heated gases from the rotary kiln exteriorly of and in contact with the elongated tube to thereby heat the material in the tube to a relatively high temperature and convert the material into a form having the characteristics of a liquid whereby the air contained therein is expanded and aids in forcing the material from the tube into the kiln.

2. The method of preheating powdered solid cement raw material or the like and feeding the same to a rotary kiln, comprising feeding such material in a regulated manner and at a relatively low temperature into one end of an elongated tubular preheating unit and producing a seal at such end, and passing the heated waste gases from the rotary kiln exteriorly of and in contact with the elongated tubular preheating unit to thereby heat the material in the elongated tubular unit to a relatively high temperature of substantially from 500° F. to 2,500° F. so that the air contained therein is expanded and aids in forcing the material from the tubular unit into the kiln.

3. The method of preheating powdered solid cement raw material or the like and feeding the same to a rotary kiln, comprising feeding such material into one end of an elongated tube and providing a seal at such end, and passing the heated gases from the rotary kiln exteriorly of and in contact with the elongated tube for heating the material to such a temperature that such material is converted into a form having the characteristics of a liquid and the air contained therein is expanded and aids in forcing the material from the tube into the kiln.

4. The method of preheating powdered solid cement raw material or the like and feeding the same into a rotary kiln, comprising feeding such material at a relatively low temperature into one end of an elongated tube and providing a seal at such end, and passing the heated gases from the rotary kiln exteriorly of and in contact with the elongated tube to thereby heat the material in the tube to a relatively high temperature whereby the air contained therein is expanded and aids in forcing the material from the tube into the kiln, the travel of the heated gases and the material being such that a high heat exchange is effected.

5. The method of preheating powdered solid cement raw material or the like and feeding the same into a rotary kiln, comprising introducing the powdered solid material into one end of an elongated tube and effecting a seal near such end while leaving the outlet end of the tube open and leading into the rotary kiln, introducing air under pressure into the powdered material, and passing the heated waste gases discharging from the rotary kiln into contact with the exterior of the elongated tube so that the material therein is heated to a relatively high temperature and the air contained within the material is expanded and aids in forcing the material from the outlet end of the tube into the kiln.

6. The method of preheating powdered solid cement raw material or the like and feeding the same to a rotary kiln, comprising feeding such powdered material to the intake end of an elongated tube and forming a seal near such intake end, introducing air into such material at a point in advance of the seal so that the material will travel to the heating zone of the tube, and passing the heated waste gases discharged from the rotary kiln in contact with the exterior of the heating zone of the elongated tube so that the material therein is heated and converted into a form having the characteristics of a liquid while the air contained therein is expanded and aids in forcing the material from the tube into the rotary kiln.

7. The method of preheating powdered solid cement raw material or the like and feeding the same to a rotary kiln, comprising feeding such material at a relatively low temperature in a regulated manner to the intake end of an elongated passage, discharging such material from the outlet end of the passage into the rotary kiln and controlling such discharge by the regulation of the feeding of the material into the passage, and passing the heated waste gases from the rotary kiln exteriorly of and in contact with the exterior of the elongated passage to thereby heat the material within the elongated passage to a relatively high temperature and convert the same into a form having the characteristics of a liquid and maintain such material free from direct contact with the heated gases.

8. The method of preheating powdered solid cement raw material or the like and feeding the same to a rotary kiln, comprising feeding such material at a relatively low temperature into one end of an elongated tube and providing a seal at such end, and passing heated gases exteriorly of and in contact with the elongated tube to thereby heat the material in the tube to a relatively high temperature and convert the same into a form having the characteristics of a liquid whereby the air contained therein is expanded and aids in forcing the material from the tube into the kiln.

9. The method of preheating powdered solid cement raw material or the like and feeding the same to a rotary kiln, comprising feeding such material at a relatively low temperature into one end of an elongated tube and providing a seal at such end, and passing heated gases exteriorly of and in contact with the elongated tube and longitudinally of the tube in an opposite direction to the travel of the heated material therein to thereby effect a high heat exchange and heat the material in the tube to a relatively high temperature and convert the same into a form having the characteristics of a liquid whereby the air contained therein is expanded and aids in forcing the material from the tube into the kiln.

10. The method of preheating powdered solid cement raw material or the like and feeding the same to a rotary kiln, comprising feeding such material at a relatively low temperature and in a regulated manner to the intake end of an elongated passage, discharging such material from the outlet end of the passage into the rotary kiln and controlling such discharge by the regulation of the feeding of the material into the passage, and passing heated gases in contact with the exterior of the passage and longitudinally thereof in an opposite direction to the travel of the material within the passage to effect a high heat exchange to thereby heat the material within the passage to a relatively high temperature and convert the same into a form having the characteristics of a liquid, and maintain such material free from direct contact with the heated gases, the air contained within the material being expanded by the relatively high temperature and aiding in forcing the material from the tube into the kiln.

11. The method of preheating powdered solid cement raw material and feeding the same to a rotary kiln, comprising feeding such material at a relatively low temperature into one end of an elongated tube and providing a seal at such end, and passing heated gases from the rotary kiln exteriorly of and in contact with the elongated tube, the length of the elongated tube and the temperature of the heated gases being such that the powdered solid cement raw material is converted into a form having the characteristics of a liquid prior to entering the rotary kiln, and feeding the heated cement raw material having the characteristics of a liquid into the rotary kiln.

DAVID J. UHLE.
MAX E. GRUNEWALD.